Patented Nov. 10, 1931

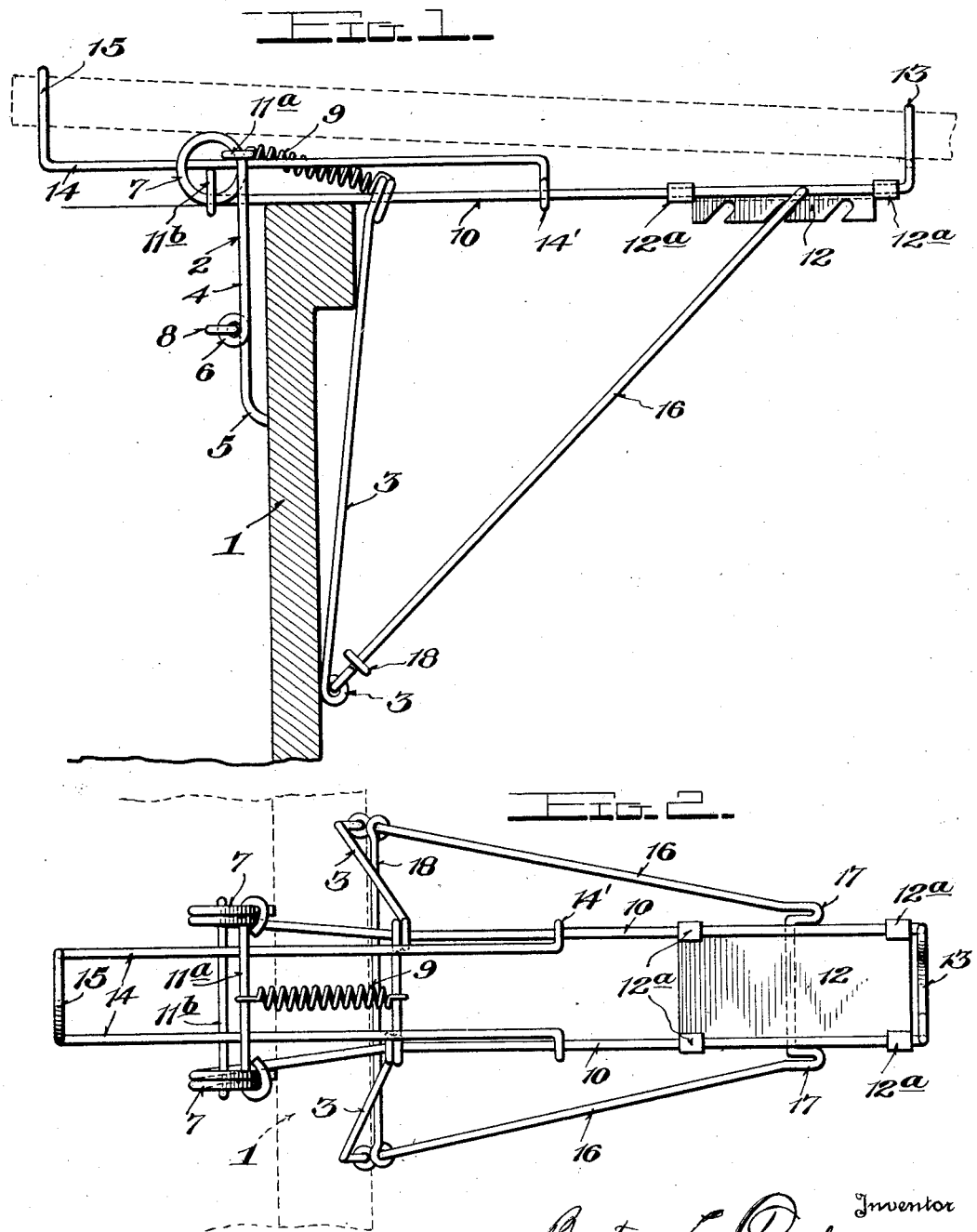

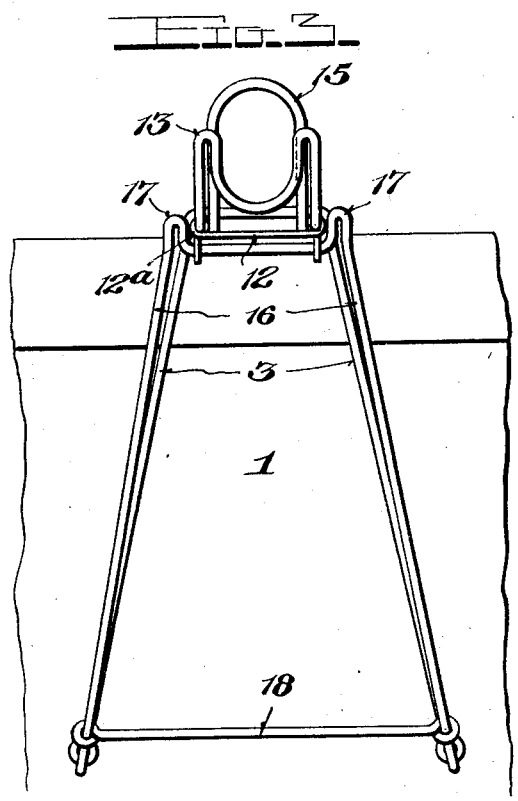
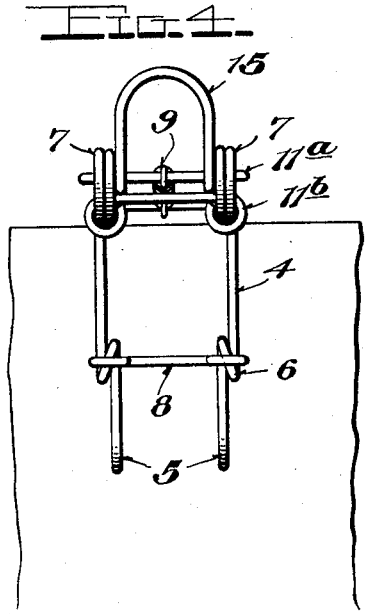
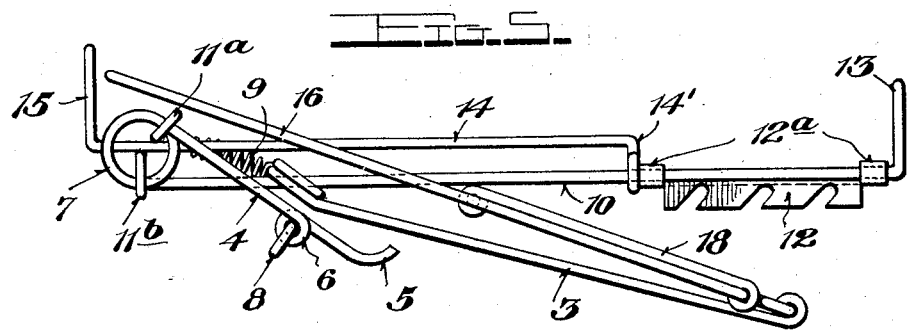

1,831,190

UNITED STATES PATENT OFFICE

BERTON L. PARKER, OF SIOUX FALLS, SOUTH DAKOTA

FISHING ROD HOLDER

Application filed December 9, 1930. Serial No. 501,141.

This invention relates to fishing rod holders and has for its primary object to provide novel and improved means for supporting a fishing rod in adjustable relation to the water.

A further object of the invention is to provide a device which is collapsible and which when in its collapsed position occupies a minimum of space and may be easily carried in the ordinary tackle box.

A still further object is to provide a device of this type which is simple, compact, rigid and yet inexpensive in construction.

Further advantages and objects of the invention will become apparent as the description proceeds, reference being had to the accompanying drawings in which:

Fig. 1 is an elevation showing the invention in operative position on the side of a boat, the latter shown in section;

Fig. 2 is a plan view of Fig. 1;

Fig. 3 is an outboard end view of Fig. 1;

Fig. 4 is an inboard end view; and

Fig. 5 is an elevation of the invention in collapsed position.

In proceeding in accordance with the present invention, the entire structure is preferably formed of spring wire. A jaw 2 is provided for clamping on the inboard side and a jaw 3 is provided on the outboard side. The jaw 2 is formed with spaced side members 4 having inwardly turned feet 5 at their bottoms, and is further provided with loops 6 intermediate the ends of the sides 4 and coils 7 at the tops thereof. The loops 6 engage a spacing member 8 so that the two side members are constantly maintained in predetermined spaced relation. The coils 7 at the top of the side members provide a positive clamping force since it is only by virtue of motion against the spring action of these coils that the jaw 2 may be positioned as shown. Linking jaw 2 with jaw 3 is a small coil spring 9 having one of its ends attached to a link or spacing member 11a which latter is connected at its ends to the coils 7, while the other end of the spring is connected to the jaw 3. The jaw 3 is of U-shape and has its free ends or legs extending downwardly to engage the side of the boat. At its upper end, immediately adjacent the bight are formed loops through which extend a lower support or arm 10 later to be described. It is to the bight portion of the jaw 3 that the coil spring 9 is connected.

The coils 7 are extended to form the lower support or arm 10. The sides of the arm 10 are maintained in spaced relation by means of a second coil-engaging spacing bar 11b at their inner ends and by a plate 12 at their outer extremities. The plate 12 is formed of sheet metal and has its sides bent downwardly and formed with cut-outs or notches. At its four corners extensions 12a of the sides of the plate 12 are provided and bent around the sides of the arm 10 so as to rigidly connect the sides and also mount the plate 12 on the arm. The members 10 are in reality one piece having its extreme outer portion upset and bent to form the upfacing U-shaped rod engaging means 13.

An inner fishing rod engaging member or arm 14 is provided, and is formed of a single length of wire that has its free ends bent downwardly and looped at 14' around the sides of the lower member 10 so as to slidably connect the two members. The sides of the member 14 then pass under the spacing bar 11a and over the spacing bar 11b. The extreme inner end or bight is upset to form the downwardly facing U-shaped rod engaging seat 15. A U-shaped brace or support 16 is provided having its free ends connected to loops 3' of the outboard jaw 3 and its bight formed with loops 17 which latter prevent lateral movement when the bight is positioned in the notches of the plate 12. A spacing member 18 is shown having its ends looped about the sides of the brace 16 to laterally spread same and hence simultaneously spread the jaw 3 whereby a triangular support is provided for the parts that extend outwardly from the boat.

In operation, the device being originally in the collapsed position shown in Fig. 5, the brace 16 for the outboard jaw 3 is swung over the end of the lower support member 10 until it is nearly in position: i. e. with its brace engaging the plate 12. The inboard jaw 2 is then positioned against the side of the boat and subsequently brace 16 is brought into engagement with the plate 12. This forces the jaw 3 against the side of the boat. The spacing member 18 is then slid to its lowermost final position as shown in Fig. 3. A rod or pole may then be inserted below the U-shaped member 15 and carried above the support 13. To collapse the device, reversing the motion of the parts as described above is all that is necessary.

What is claimed is:

1. A collapsible fishing rod holder including, a jaw to engage the out-board side of a boat, a horizontal arm formed of spring material carried by said jaw and having a rod engaging seat at its outer end, a plate having notched downwardly extending flanges carried by said arm at its outer end, diagonal brace means carried by said jaw and adjustably engaged in the notches of said plate, said horizontal arm having coiled portions which latter are continued to form a second jaw to engage the in-board side of a boat whereby said second jaw is tensioned by said coils, means engaging the coils of said jaw to maintain a predetermined spacing between its sides, spring means connecting one of said spacing means and said first named out-board jaw and a rod engaging member carried between said coil engaging spacing members and slidably mounted on said horizontal arm.

2. A collapsible fishing rod holder including a jaw to engage the out-board side of a boat, a horizontal arm formed of spring material carried by said jaw and having a rod engaging seat at its outer end, diagonal brace means carried by said jaw, means carried by said arm to adjustably engage the upper end of said brace for vertical adjustment relative to the side of the boat, a spring tensioned second jaw carried by said horizontal arm to engage the in-board side of a boat, spacing means carried by said second jaw to maintain the sides thereof in spaced relation, spring means linking one of said spacing members and said first named out-board jaw, and a rod engaging member slidably carried by said horizontal arm and mounted between said spacing means.

3. A collapsible fishing rod holder including a horizontal arm having rod engaging means at its outer end, spaced exterior and interior boat engaging jaw members carried by and depending from said arm, means carried between said exterior jaw and said arm for angular adjustment of the latter and a second rod engaging means carried by said arm and slidable lengthwise thereof.

4. In a collapsible fishing rod holder, a horizontal arm having rod engaging means, a depending jaw carried by said arm for engaging the in-board side of a boat, a slidable jaw mounted on said arm for engaging the out-board side of a boat, and a brace member carried by the last named jaw and adjustably engageable with said arm whereby the elevation of said arm may be changed to correspondingly vary the angular relation of the pole to the water.

5. In a collapsible fishing rod holder, a horizontal arm having rod engaging means, a depending jaw carried by said arm for engaging the in-board side of a boat, a depending bracket slidably supported from said arm adapted to engage the out-board side of a boat, and a brace member pivoted to the lower end of the bracket and having its free end adjustably engaged with the outer end of the horizontal arm.

6. A collapsible fishing rod holder for boats including a horizontal arm formed of spring material having its inner end bent to provide a tensioned depending jaw adapted to engage the in-board side of a boat, a slidable rod engaging member supported on said arm, a depending bracket having one end slidably supported on said arm and having its lower free end formed to engage the out-board side of a boat, spring means for urging the upper end of the bracket into engagement with the boat, and a brace member pivotally mounted on the lower end of said bracket and having its free end adjustably engaged with the outer end of the horizontal arm.

7. A collapsible fishing rod holder including a horizontal arm formed of spring material coiled adjacent one end thereof and extended downwardly to provide a depending tensioned jaw adapted to engage the in-board side of a boat, a depending bracket slidably mounted on said arm and adapted to engage the out-board side of a boat, and a brace member secured to said bracket and engageable with said arm.

8. A collapsible fishing rod holder including a horizontal arm formed of spring material coiled intermediate its ends and extended downwardly to provide a depending tensioned jaw adapted to engage the in-board side of a boat, a depending bracket engaging the out-board side of a boat having one end coiled to slidably engage said arm, and a brace pivoted to the lower end of the bracket and having its free end adjustably engaging the horizontal arm.

9. A fishing rod holder including a horizontal frame member, pole engaging means slidable on said member, a swinging jaw depending from the frame, a swinging bracket member depending from said frame and spaced from the jaw, and a brace member pivotally secured to the lower end of the bracket member and having its free end releasably engageable with the frame, said jaw and bracket member being adapted to fold against the frame member in an upward direction and the brace member being arranged to fold against the frame in a downward direction whereby the holder may be collapsed.

10. A fishing rod holder including a member formed to seat on the gunwale of a boat, means depending from the member and engageable with the in-board side of a boat, other means depending from the member and engageable with the out-board side of a boat, means to effect relative clamping of said depending means against the said sides of the boat, rod engaging means carried by the member, and means carried by the said means which engages the out-board side of the boat and adjustably engaged with said member whereby the elevation of the latter may be varied.

In testimony whereof I affix my signature.

BERTON L. PARKER.